United States Patent Office 2,835,656
Patented May 20, 1958

2,835,656

LIGHT-SENSITIVE POLYMERS FOR PHOTOGRAPHY

Cornelius C. Unruh and Donald A. Smith, Rochester, N. Y., assignors to Eastman Kodak Company, Rochester, N. Y., a corporation of New Jersey No Drawing. Application November 25, 1953
Serial No. 394,501

11 Claims. (Cl. 260—78.5)

This invention relates to the preparation of light-sensitive polymers of particular use in photography, made by the reaction of maleic anhydride copolymers with a monocinnamic acid ester of a dihydric alcohol.

Efforts have previously been made to react maleic anhydride polymers directly with partial esters of polyhydric alcohols. Gerhardt et al. U. S. Patent 2,320,724, granted June 1, 1943, states that maleic anhydride copolymers do not react directly with partially esterified polyhydric alcohols and that it is necessary to previously esterify the maleic anhydride copolymer with a simple alcohol, such as ethyl alcohol, before the polyhydric alcohol partial ester will react with the copolymer.

We have discovered quite unexpectedly that while the reaction may have the mentioned limitations when aliphatic acid partial esters of polyhydric alcohols are employed for the esterification of maleic anhydride copolymers, no such limitation in the reaction exists when monocinnamic acid esters of dihydric alcohols are employed for the esterification. In other words, we find that it is not necessary to esterify a maleic anhydride copolymer with a simple alcohol before esterifying with the monocinnamic acid esters. Moreover, our process yields polymers which may contain a larger proportion of free carboxyl groups than the products of the patent mentioned.

The polymers of the invention contain recurring units having the probable general formula

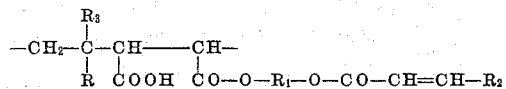

wherein R is a hydrogen atom or a group derived from a vinyl compound polymerizable with maleic anhydride, such as a monocyclic aryl group of the benzene series as phenyl, substituted phenyl, acetoxyl, carbalkoxyl, e. g., carbethoxyl, alkoxyl, e. g., methoxyl, e. g., m-nitrophenyl, halogen, e. g., chlorine, etc., as respectively present in copolymers of maleic anhydride wih ethylene, styrene, vinyl acetate, methyl acrylate, methyl vinyl ether, m-nitrostyrene, vinyl chloride. $R_3$ represents either a hydrogen atom as present in the above compounds polymerizable with maleic anhydride, or $R_3$ represents a lower alkyl group such as methyl such as present in α-methyl vinyl compounds polymerizable with maleic anhydride, e. g., α-methyl styrene, α-methyl vinyl acetate (isopropenyl acetate), methyl methacrylate, α-methyl vinyl ether, and α-methyl vinyl chloride (isopropenyl chloride). $R_1$ is an alkylene group derived from glycols such as ethylene, n-propylene, isopropylene, butylene, such as —CH(CH$_3$)CH$_2$CH$_2$—, —CH(CH$_3$)CH(CH$_3$)—
and
—CH(C$_2$H$_5$)CH$_2$—
and the groups
—CH$_2$CH$_2$—O—CH$_2$CH$_2$—
and
—(CH$_2$)$_2$—O—(CH$_2$)$_2$—O—(CH$_2$)$_2$—

$R_2$ represents a monocyclic aryl group of the benzene series, e. g., phenyl, o-chlorophenyl and m-nitrophenyl groups derived from the corresponding cinnamic acids.

In preparing the polymers of the invention, one of the first steps is to prepare a monocinnamic acid ester of a glycol, e. g., a monocinnamic, o-chlorocinnamic or m-nitrocinnamic acid ester of a glycol such as ethylene glycol, α- or β-propylene glycols, butylene glycols, e. g., 1,4-butylene or other butylene glycol having an alkylene group indicated above, diethylene glycol or triethylene glycol. The cinnamoyl group of the ester should, of course, be free of substituents reactive with the anhydride group of the copolymer, e. g., hydroxyl and amino substituents. The following examples illustrate the preparation of such monesters.

A suitable copolymer of maleic anhydride can be prepared by well known methods such as those involving peroxide catalyzed polymerization of maleic anhydride with polymerizable vinyl compounds such as ethylene, styrene, m-nitrostyrene, vinyl acetate, vinyl methyl ether, vinyl chloride, etc. The maleic anhydride copolymers preferred are those which contain approximately equal parts of maleic anhydride and the polymerizable vinyl compound as are readily prepared by conventional methods. However, it is desirable to incorporate as large a percentage of maleic anhydride groups into the copolymer molecule as is possible in order to increase the percentage of maleic anhydride groups available for reaction with the monocinnamic acid esters.

The polymers of the invention are then readily obtained by merely heating in essentially anhydrous organic solvent media such as pyridine, a mixture of at least equal molecular parts of the monocinnamic acid ester of the glycol and the maleic anhydride copolymer. Generally, it is desirable to employ an excess of the cinnamic ester to insure complete reaction with the copolymer and thus obtain a polymer having maximum light-sensitivity. However, polymers having valuable properties are obtained when less than all of the maleic anhydride groups of the copolymers are esterified and the remaining unreacted maleic anhyride groups of the polymer are hydrolyzed.

It is therefore apparent that contrary to the prior art in our process it is not necessary to first react the maleic anhydride copolymer with a simple alcohol before esterification with the monocinnamic acid esters of the glycols. A further feature of the polymers of the invention lies in the fact that they are light-sensitive, whereas similar polymers, e. g., made by the esterification of maleic anhydride copolymers with monoaliphatic acid esters of glycols, such as the mono-stearic or mono-oleic acid esters of glycol, are not light-sensitive and are therefore useless for our photographic purposes. That is, the polymers of the invention are solvent-soluble and can therefore be coated onto suitable bases such as zinc, aluminum and magnesium plates. For photomechanical purposes the layers can then be exposed to high intensity radiations such as a carbon arc, under an image such as a line or halftone negative with the result that the exposed areas of the polymer layer become insoluble in solvents and the unexposed areas can be removed from the plate with solvent to yield a resist image which allows the plate to be etched or otherwise treated to render the product suitable as a printing plate. Moreover, while our polymers possess low light-sensitivity compared to other photographic elements such as photographic silver halide emulsion layers, the polymers can be sensitized to increase the rate at which they become insoluble on exposure to light. Light-sensitizing agents which can be thus used are those disclosed in U. S. Patent 2,610,120, Minsk et al. U. S. patent applications Serial Nos. 207,048–51, filed January 21, 1951, Robertson et al. U. S. patent application Serial No. 314,806, filed October 15, 1952, i. e., nitro compounds, triphenyl methanes, anthrones, quinones, ketones and thiazole compounds such as nitro anilines, crystal violet carbinol base, 1-carbethoxy-2-keto-3 - methyl - 3 - azabenzanthrone, 1,2 - benzanthraquinone, Michler's ketone, and 1-methyl-β-naphthothiazoline.

The following examples illustrate the preparation of the polymers of the invention:

*Example 1.—The preparation of ethylene glycol monocinnamate*

Twelve hundred fifty grams of ethylene glycol was mixed with 500 ml. of dry pyridine in a flask fitted with stirrer and dropping funnel, the outside of the vessel being cooled with running water. To the stirred mixture was added dropwise 833 grams of molten cinnamoyl chloride at such a rate that the temperature did not rise above 25° C. When the addition was complete, the mixture was stirred for 1 hour at room temperature. The reaction product was poured into a large volume of cold water and after adding 3 l. of chloroform was well stirred. The chloroform layer was separated and washed thoroughly first with cold water, then dilute sulfuric acid and finally sodium bicarbonate solution. The chloroform layer was separated and dried over anhydrous magnesium sulfate.

The chloroform solution was filtered, and the solvent distilled off to leave a yellow oil as residue. This was heated on the steam bath in vacuo to remove the last traces of solvent. This product can be used without further purification in reaction with maleic anhydride copolymers. The yield was 790 g.

It may be further purified by distillation in high vacuum. A small amount of crystalline material can be removed by filtration before distillation, this being the dicinnamate. About 75 percent of this crude product distilled at 98–105° C. at 8–10 microns using a 5 inch centrifugal still.

*Example 2.—Preparation of a reaction product of β-hydroxyethyl cinnamate (ethylene glycol monocinnamate) with a styrene-maleic anhydride copolymer*

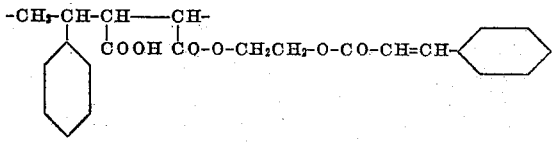

A styrene-maleic anhydride copolymer was dried by heating at 110° C. for 5 hours and using this a 20 percent solution was made in dried dioxane.

To 50 g. of this solution was added 15 g. of β-hydroxyethyl cinnamate and the solution was heated under reflux on the steam bath for 20 hours. The product was thinned with 50 ml. of acetone and then poured into excess agitated distilled water. The precipitate was twice redissolved in acetone and precipitated into distilled water. The white, fibrous product was dried at 40° C.

A dilute solution of this product in methyl ethyl ketone was coated on Duplimat paper and exposed through a photographic negative. Development of the exposed coating was carried out with methyl ethyl ketone, followed by application of a greasy ink to the dampened surface gave a positive image corresponding to the negative used.

*Example 3.—Preparation of a reaction product of β-hydroxyethyl cinnamate (ethylene glycol monocinnamate) with a styrene-maleic anhydride copolymer*

Two hundred grams of a 10% solution of a dried styrene-maleic anhydride copolymer in pyridine was mixed with 25 g. of β-hydroxyethyl cinnamate and the solution heated on the steam bath for 6 hours. The brown solution was poured into an excess of dilute acetic acid (using distilled water), the precipitate was redissolved in acetone and again precipitated into distilled water. The fibrous precipitate was washed well with distilled water and dried at 40° C.

This polymer had a sensitometric speed of 1.1, but when sensitized with 2-benzoyl-methylene-1-methyl naphthothiazoline it showed a speed of 450. The coating on engraver's zinc was resistant to nitric acid so that an etch 0.004″ deep could be obtained.

*Example 4.—Reaction between a styrene-maleic anhydride copolymer and ethylene glycol monocinnamate*

Twelve grams of a dried styrene-maleic anhydride copolymer was dissolved in 35 ml. of dry pyridine. To this was added 12 g. of ethylene glycol monocinnamate, and the solution was heated in a constant temperature water bath for 21 hours at 75° C. The product was thinned with acetone and precipitated into excess distilled water. The precipitate was redissolved in acetone and again precipitated by pouring into agitated distilled water. The white, fibrous product was dried at 40° C.

This polymer when coated out, exposed and processed in the standard manner showed a sensitometric speed of 1.8. When sensitized with 2-benzoyl methylene-1-methyl-β-naphthothiazoline it had a speed of 700.

*Example 5.—Reaction between β-hydroxyethyl cinnamate and a styrene-maleic anhydride copolymer*

To a mixture consisting of 10 g. of a copolymer of styrene with maleic anhydride, 5 g. of anhydrous sodium acetate and 100 g. of glacial acetic acid there was added 10 g. of β-hydroxyethyl cinnamate. This was heated on the steam bath, and after 1 hour complete solution occurred. After heating for 2 hours, the solution was poured into an excess of distilled water. The rubbery, white polymer was redissolved in acetone and the solution again poured into distilled water. A fibrous white polymer formed which was dried at 40° C. The carboxyl content of the product was 15.4%.

The above procedure was repeated, except that 20 g. of β-hydroxyethyl cinnamate was used in the reaction, solution taking place after a half hour heating on the steam bath.

The polymers prepared by both methods had good light-sensitivity and were found to consist essentially of 1 to 1 copolymers of styrene and the maleic acid half-ester.

*Example 6.—Preparation of ω-hydroxy butyl cinnamate*

To 270 g. of redistilled 1,4-butanediol in an all-glass apparatus fitted with stirrer, thermometer and dropping funnel was added 150 ml. of dry pyridine. While stirring constantly and with cooling of the outside of the flask there was added dropwise over a period of 45 minutes 250 g. of cinnamoyl chloride. The temperature did not rise above 42° C. during this addition, and when it was complete, stirring was continued for 1 hour at room temperature. About 1 l. of chloroform was added to the product, and this solution was extracted first with 3 portions of cold water followed by extractions with dilute sulfuric acid, water and finally dilute sodium bicarbonate solution. The chloroform extract was dried over anhydrous sodium sulfate and the chloroform was distilled off by heating on the steam bath, the last traces being removed in vacuo. The viscous, pale yellow residue on standing formed a white crystalline precipitate which could be filtered off. The filtrate, ω-hydroxy butyl cinnamate, was used without further purification.

*Example 7.—Reaction between a styrene-maleic anhydride copolymer with ω-hydroxy butyl cinnamate*

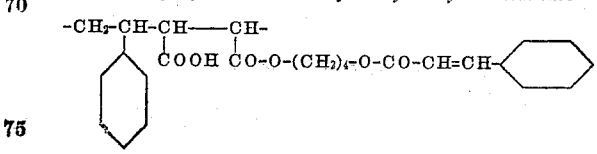

To a solution of 10 g. of a heteropolymer of styrene and maleic anhydride dissolved in 50 ml. of dry pyridine there was added a solution consisting of 20 g. of ω-hydroxybutyl cinnamate and 10 ml. of dry pyridine. The solution was heated for 2½ hours on the steam bath, whereupon 50 ml. of acetone was added to the solution. The soft, white precipitate was pressed out, and redissolved in acetone. This solution was again poured into an excess of distilled water, and the soft precipitate dissolved again in acetone and poured into distilled water. The slightly rubbery but fibrous precipitate was rinsed in fresh distilled water and dried at 40° C. The yield was 18 g. The carboxyl content of the polymer indicated that it consisted essentially of a 1:1 copolymer of styrene and a monoester of maleic acid with ω-hydroxy butyl cinnamate.

This polymer showed a sensitivity of 1 when coated, exposed and developed in the standard manner. The use of a number of the indicated sensitizers greatly enhanced this sensitometric speed.

*Example 8.—Reaction between a vinyl methyl ether-maleic anhydride copolymer and β-hydroxyethyl cinnamate*

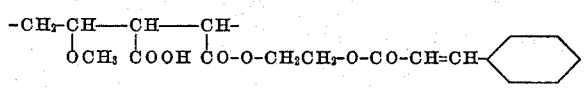

To 50 g. of a 20% solution of a vinyl-methyl ether-maleic anhydride copolymer in dry pyridine was added 20 g. of β-hydroxyethyl cinnamate. The mixture was heated for 3 days at 70° C., then poured into a large volume of dilute acetic acid, the soft gummy precipitate being twice reprecipitated from acetone solution by pouring it into an excess of distilled water, finally drying at 40° C. to give a tough and rubbery polymer.

Exposure of a coating of this polymer to ultraviolet light through a photographic negative, and subsequent development in acetone gave an image which corresponded to the negative used.

*Example 9.—Preparation of diethylene glycol monocinnamate*

To a solution of 500 g. (4.7 mol) diethylene glycol in 150 ml. of pyridine kept at 27–33° C. was added dropwise 185 g. (1.0 mol) cinnamoyl chloride. After standing 15 hours at room temperature, the mixture was drowned in water and the separated oil washed with dilute sodium carbonate, then with water. After drying over magnesium sulfate, the oil was distilled in vacuum and the fraction, B. P. 188–190°/1–2 mm. collected.

*Example 10.—Reaction of diethylene glycol monocinnamate with styrene-maleic anhydride copolymer*

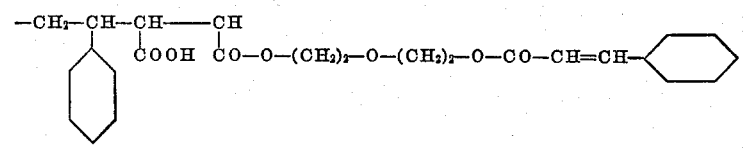

A solution of 10.0 g. of a styrene-maleic anhydride copolymer in pyridine was treated with 11.7 g. of diethylene glycol monocinnamate and the solution heated 15 hours on the steam bath. The product was isolated by precipitation in dilute acetic acid and purified by solution in acetone and reprecipitation in water.

This product showed a sensitometric speed of 700 when sensitized with 2-benzoyl-methylene-1-methyl-β-naphthothiazoline.

*Example 11.—Reaction of ethylene glycol mono-o-chlorocinnamate with styrene-maleic anhydride copolymer*

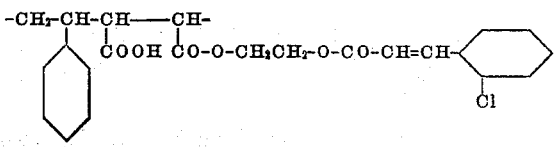

A solution of 5.0 g. styrene-maleic anhydride in 100 ml. pyridine was treated with 4.8 g. ethylene glycol mono-o-chlorocinnamate in 5 ml. pyridine. After 6.5 hours at room temperature, the product was obtained by precipitation in dilute acetic acid followed by a benzene wash. Dried yield 7.1 g.

This polymer when coated, exposed and developed in the usual manner, gave an ink receptive image corresponding to the negative used.

*Example 12.—Reaction of ethylene glycol monocinnamate with isopropenyl acetate-maleic anhydride copolymer*

To a 10% solution of an approximately 1 to 1 isopropenyl acetate-maleic anhydride copolymer in pyridine was added two molecular equivalents of ethylene glycol monocinnamate followed by heating the solution for several hours on a steam bath. The product was isolated by diluting the reaction mixture with acetone and precipitating into dilute acetic acid.

A copolymer of maleic anhydride-vinyl acetate (1 to 1) reacted similarly with ethylene glycol monocinnamate to also yield a light-sensitive polymer.

What we claim is:

1. A method for preparing a light-sensitive polymer which comprises heating a copolymer of styrene and maleic anhydride with ethylene glycol monocinnamate in inert organic solvent until a light-sensitive organic solvent soluble polymer has been obtained, and isolating the polymer from the reaction mixture.

2. A method for preparing a light-sensitive polymer which comprises heating a copolymer of styrene and maleic anhydride with diethylene glycol monocinnamate in inert organic solvent until a light-sensitive organic solvent soluble polymer has been obtained, and isolating the polymer from the reaction mixture.

3. A method for preparing a light-sensitive polymer which comprises heating a copolymer of styrene and maleic anhydride with butylene glycol monocinnamate in inert organic solvent until a light-sensitive organic solvent soluble polymer has been obtained, and isolating the polymer from the reaction mixture.

4. A method for preparing a light-sensitive polymer which comprises heating a copolymer of styrene and maleic anhydride with ethylene glycol mono-o-chlorocinnamate in inert organic solvent until a light-sensitive organic solvent soluble polymer has been obtained, and isolating the polymer from the reaction mixture.

5. A light-sensitive polymer containing recurring units having the formula

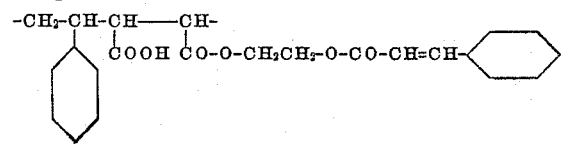

6. A light-sensitive polymer containing recurring units having the formula.

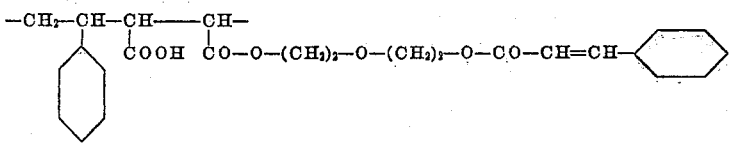

7. A light-sensitive polymer containing recurring units having the formula

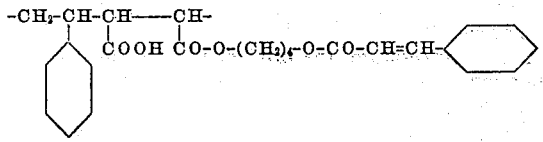

8. A light-sensitive polymer containing recurring units having the formula

9. A light-sensitive polymer containing recurring units having the formula

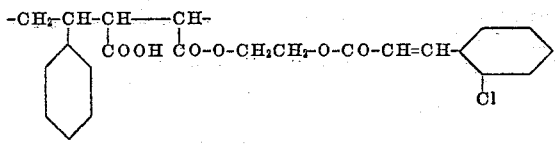

10. A method for preparing a light-sensitive polymer which comprises heating a copolymer of styrene and maleic anhydride with a monoester of an acid of the class consisting of cinnamic acid, o-chloro cinnamic acid and m-nitro cinnamic acid and a glycol of the class consisting of ethylene glycol, propylene glycols, butylene glycols, diethylene glycol and triethylene glycol, in an inert organic solvent until a light-sensitive organic solvent soluble polymer has been obtained, and isolating the polymer from the reaction mixture.

11. A light-sensitive polymer containing recurring units having the general formula

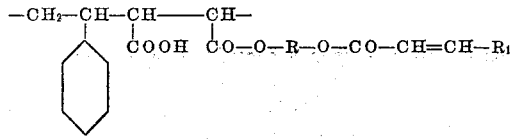

wherein R represents a member of the class consisting of ethylene, propylene, and butylene groups and the groups

—$CH_2CH_2$—O—$CH_2CH_2$—
—$(CH_2)_2$—O—$(CH_2)_2$—O—$(CH_2)_2$— and $R_1$ represents a member of the class consisting of phenyl, o-chlorophenyl and m-nitrophenyl groups.

References Cited in the file of this patent
UNITED STATES PATENTS
2,324,739    Stoops _____ July 20, 1943